US012732710B2

(12) United States Patent
Kim

(10) Patent No.: US 12,732,710 B2
(45) Date of Patent: Sep. 8, 2026

(54) IMAGE SIGNAL PROCESSOR AND METHOD FOR PROCESSING IMAGE SIGNAL

(71) Applicant: SK hynix Inc., Gyeonggi-do (KR)

(72) Inventor: Jin Su Kim, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 306 days.

(21) Appl. No.: 18/353,104

(22) Filed: Jul. 17, 2023

(65) Prior Publication Data

US 2024/0236506 A1 Jul. 11, 2024

(30) Foreign Application Priority Data

Jan. 9, 2023 (KR) ........................ 10-2023-0003102

(51) Int. Cl.

| | |
|---|---|
| ***H04N 23/81*** | (2023.01) |
| ***G06T 5/20*** | (2006.01) |
| ***G06T 5/50*** | (2006.01) |
| ***G06T 5/70*** | (2024.01) |
| ***G06T 5/73*** | (2024.01) |

(52) U.S. Cl.

CPC ............... *H04N 23/81* (2023.01); *G06T 5/20* (2013.01); *G06T 5/50* (2013.01); *G06T 5/70* (2024.01); *G06T 5/73* (2024.01); *G06T 2207/20192* (2013.01)

(58) Field of Classification Search

None

See application file for complete search history.

(56) References Cited

U.S. PATENT DOCUMENTS 6,094,511 A * 7/2000 Metcalfe .................. G06T 5/75 702/194
2020/0401889 A1* 12/2020 Lee .......................... G06T 5/73

FOREIGN PATENT DOCUMENTS

JP H0950519 A * 2/1997
KR 10-2011-0091838 A 8/2011

OTHER PUBLICATIONS

English translation of JP-H0950519-A, Ota, 1997 (Year: 1997).*

* cited by examiner

*Primary Examiner* — James M Hannett
(74) *Attorney, Agent, or Firm* — IP&T GROUP LLP

(57) ABSTRACT

An image signal processor for reducing noise of an image and performing a sharpening process of the image, and a method for processing an image signal are disclosed. The image signal processor includes an input image selection circuit configured to select a first image and a second image obtained by binning the first image as a first input or a second input, and an integrated filtering circuit configured to perform a filtering operation for a selected image by selecting the input image selection circuit in response to an input order of the first input and the second input, and thus output one of a noise-removed image and a sharpened image.

17 Claims, 4 Drawing Sheets

IMAGE SIGNAL PROCESSOR AND METHOD FOR PROCESSING IMAGE SIGNAL

CROSS-REFERENCE TO RELATED APPLICATION

The present application claims priority under 35 U.S.C. § 119 to, and the benefits of, Korean patent application No. 10-2023-0003102, filed on Jan. 9, 2023, which is hereby incorporated by reference in its entirety and made a part thereof.

TECHNICAL FIELD

The technology and implementations disclosed in the present disclosure generally relate to an image signal processor for reducing noise of an image and performing a sharpening process of the image.

BACKGROUND

Recently, with rapid development of imaging devices, the development of image photographing devices such as cameras and camcorders equipped with image sensors is rapidly increasing. The number of users of such an image photographing device is rapidly increasing because the image photographing device can reproduce images at any time while photographing images and recording the photographed images on a recording medium. Accordingly, users' demands for performance and functions of the imaging devices are gradually increasing, and research is being conducted on image processing devices capable of obtaining high-quality images along with miniaturization, light weight, and low power consumption of manufactured products.

However, the quality of images may be degraded due to image elements such as dynamic range, color gamut, color accuracy, distortion, uniformity, blurriness, texture, edge, etc.

In order to provide an image with improved quality by processing such image elements, various filtering processes such as noise reduction or sharpening may be performed. If a filter capable of increasing edge sharpness while reducing noise of images can be implemented as a single logic circuit, it will be efficient in terms of device implementation.

SUMMARY

Various embodiments of the disclosed technology relate to an image signal processor capable of implementing a filter that removes noise of an image and performs a sharpening process of the image as a single logic circuit.

In accordance with an embodiment of the disclosed technology, an image signal processor may include: an input image selection circuit configured to select a first image and a second image obtained by binning the first image as a first input or a second input; and an integrated filtering circuit configured to perform a filtering operation for a selected image by selecting the input image selection circuit in response to an input order of the first input and the second input, and output one of a noise-removed image and a sharpened image.

In accordance with another embodiment of the disclosed technology, a method for processing an image signal may include: in response to a first selection signal, selecting a first image as a first input and selecting a second image obtained by binning the first image as a second input; in response to a second selection signal, selecting the second image as the first input and selecting the first image as the second input; and performing one of a first filtering process operation for the first image or the second image and a second filtering process operation for the first image or the second image in response to an input order of the first input and the second input.

In accordance with another embodiment of the disclosed technology, a method for operating an image processor may comprise: receiving a first image including pixels of an edge region and a flat region; upscaling the first image to generate a second image; determining whether a sharpness of pixels of the edge region is low or pixels of the flat region include noise based on a filtering coefficient determined by using variance and covariance values for each of the first and second images; sharpening the edge region of the first image according to a determination that the sharpness of the pixels of the edge region is low; and filtering the flat region of the first image according to a determination that the pixels of the flat region include the noise.

It is to be understood that both the foregoing general description and the following detailed description of the disclosed technology are illustrative and descriptive, and are intended to provide further description of the disclosure as claimed.

BRIEF DESCRIPTION OF THE DRAWINGS

The above and other features and beneficial aspects of the disclosed technology will become readily apparent with reference to the following detailed description when considered in conjunction with the accompanying drawings.

DETAILED DESCRIPTION

Figure 1:
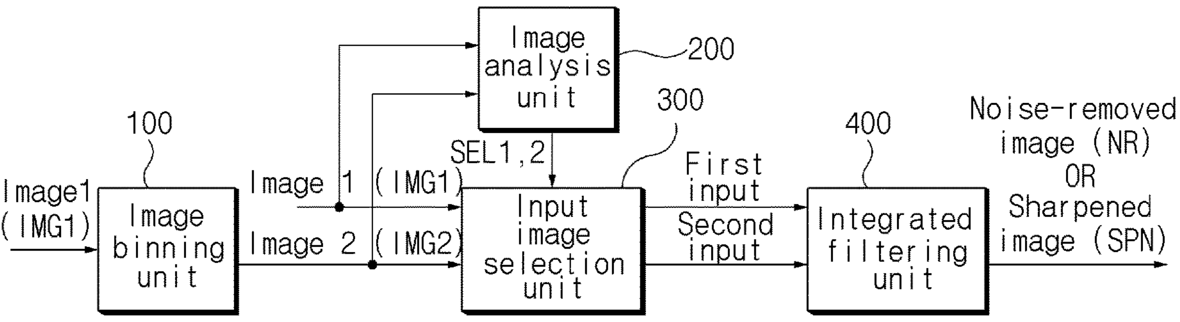
FIG. 1 is a block diagram illustrating an example of an image signal processor based on some embodiments of the disclosed technology.

The present disclosure provides embodiments and examples of an image signal processor and a method for processing an image signal that may be used in configurations to substantially address one or more technical or engineering issues and to mitigate limitations or disadvantages encountered in some other image signal processors. Some embodiments of the disclosed technology relate to an image signal processor capable of implementing a filter that removes noise of an image and performs a sharpening process of the image as a single logic circuit. In recognition of the issues above, the disclosed technology can implement a filter that removes noise of an image and performs a sharpening process of the image as a single logic circuit, thereby improving the quality of images and easily implementing devices.

Reference will now be made in detail to the embodiments of the disclosed technology, examples of which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, the disclosure should not be construed as being limited to the embodiments set forth herein.

Hereafter, various embodiments will be described with reference to the accompanying drawings. However, it should be understood that the disclosed technology is not limited to specific embodiments, but includes various modifications, equivalents and/or alternatives of the embodiments. The embodiments of the disclosed technology may provide a variety of effects capable of being directly or indirectly recognized through the disclosed technology.

FIG. 1 is a block diagram illustrating an example of an image signal processor based on some embodiments of the disclosed technology.

Referring to FIG. 1, the image signal processor may include an image binning unit (i.e., image binning circuit) 100, an image analysis unit (i.e., image analysis circuit) 200, an input image selection unit (i.e., input image selection circuit) 300, and an integrated filtering unit (i.e., integrated filtering circuit) 400.

The image binning unit 100 may output an image 2 (IMG2) by binning the received image 1 (IMG1). Here, the image 2 (IMG2) may be an upscaled image obtained by summing pixel values of the image 1 (IMG1).

The image analysis unit 200 may analyze the image 1 (IMG1) and the image 2 (IMG2) received from the image binning unit 100. Then, the image analysis unit 200 may generate a first selection signal SEL1 for selecting the image 1 (IMG1) as an input image and a second selection signal SEL2 for selecting the image 2 (IMG2) as an input image.

For example, the image analysis unit 200 may analyze a texture of the image to determine whether a filtering operation for removing noise or a filtering operation for a sharpening (or sharpness) process is required. Here, the texture of the image may include information indicating whether the texture of the image is pixels of an edge region of the image or pixels of a flat region of the image.

In some embodiments, the image analysis unit 200 may analyze both images (IMG1, IMG2) to determine whether detailed image information is included in the images (IMG1, IMG2). Here, the detailed image information may indicate whether an image that is not sharp is located in an edge region of the images (IMG1, IMG2). For example, the image analysis unit 200 may analyze the image and determine whether a filtering operation for a sharpening process of the image is required when sharpness is lowered in the edge region of the images (IMG1, IMG2). In this case, the image analysis unit 200 may output the first selection signal SEL1.

On the other hand, the image analysis unit 200 may analyze both images (IMG1, IMG2) to determine whether a blurring signal is included in the images (IMG1, IMG2). Here, the blurring signal may indicate a noise contained in the images (IMG1, IMG2). For example, the image analysis unit 200 may analyze the image and determine that a filtering operation for removing noise is required when the image includes noise in pixels of a flat region of the images (IMG1, IMG2). In this case, the image analysis unit 200 may output the second selection signal SEL2.

In some embodiments, although the image analysis unit 200 selects a filtering operation by determining whether detailed image information or a blurring signal is included in an image for convenience of description, the scope or spirit of the disclosed technology is not limited thereto, and it should be noted that the image analysis unit 200 can also select the filtering operation by determining other elements of the image.

In addition, an embodiment of the disclosed technology has disclosed an example in which either a sharpening operation or a noise filtering operation is selected through the image analysis unit 200 for convenience of description, but the embodiment of the disclosed technology is not limited thereto. In some embodiments, the image signal processor according to the disclosed technology may not include a separate image analysis unit 200, and may thus select one of a sharpening filtering operation and a noise filtering operation in response to a predetermined selection signal SEL1 or SEL2 without using the image analysis unit 200.

In addition, although the embodiment of the disclosed technology has disclosed that the image analysis unit 200 analyzes both of the image 1 (IMG1) and the image 2 (IMG2), the scope or spirit of the disclosed technology is not limited thereto, and it should be noted that the image analysis unit 200 can analyze only the image 1 (IMG1) indicating an original image (base image) as needed.

The input image selection unit 300 may select the image 1 (IMG1) as a first input (i.e., 'input1' to be described later) or a second input (i.e., 'input2' to be described later) in response to the selection signal SEL1 or SEL2 received from the image analysis unit 200. Alternatively, the input image selection unit 300 may select the image 2 (IMG2) as a first input or a second input in response to the selection signal SEL1 or SEL2 received from the image analysis unit 200. That is, in response to the first selection signal SEL1, the input image selection unit 300 may set the image 1 (IMG1) to the first input (input1) and set the image 2 (IMG2) to the second input (input2). On the other hand, in response to the second selection signal SEL2, the input image selection unit 300 may set the image 2 (IMG2) to the first input (input1) and set the image 1 (IMG1) to the second input (input2).

The integrated filtering unit 400 may perform a filtering processing operation in response to the input order of either the first input or the second input received from the input image selection unit 300. Then, the integrated filtering unit 400 may output an image (NR) from which noise is removed or may output a sharpened image (SPN).

The integrated filtering unit 400 may perform a filtering process operation by substituting the first input and the second input into input values of an arithmetic expression, which is described in detail below. That is, the integrated filtering unit 400 may change an input value to be applied to an arithmetic expression in response to the first input and the second input.

That is, the integrated filtering unit 400 may set any one of the pixel value of the image 1 (IMG1) and the pixel value of the image 2 (IMG2) to the first input (input1), or may set one of the pixel value of the image 1 (IMG1) and the pixel value of the image 2 (IMG2) to the second input (input2). That is, the integrated filtering unit 400 may set the pixel value of the image 1 (IMG1) to the first input (input1), and may set the pixel value of the image 2 (IMG2) to the second input (input2). On the other hand, the filtering unit 400 may set the pixel value of the image 2 (IMG2) to the first input (input1), and may set the pixel value of the image 1 (IMG1) to the second input (input2).

Since the integrated filtering unit 400 performs a filtering process operation according to the set first input and the set second input, the result of the filtering process operation may also change according to a change in such input values. The integrated filtering unit 400 may perform a filtering operation for noise removal or a filtering operation for a sharpening process in response to a calculation result of the arithmetic expression.

The configuration and operation process of the integrated filtering unit 400 will be described in more detail with reference to FIG. 3 to be described later.

Figure 2:
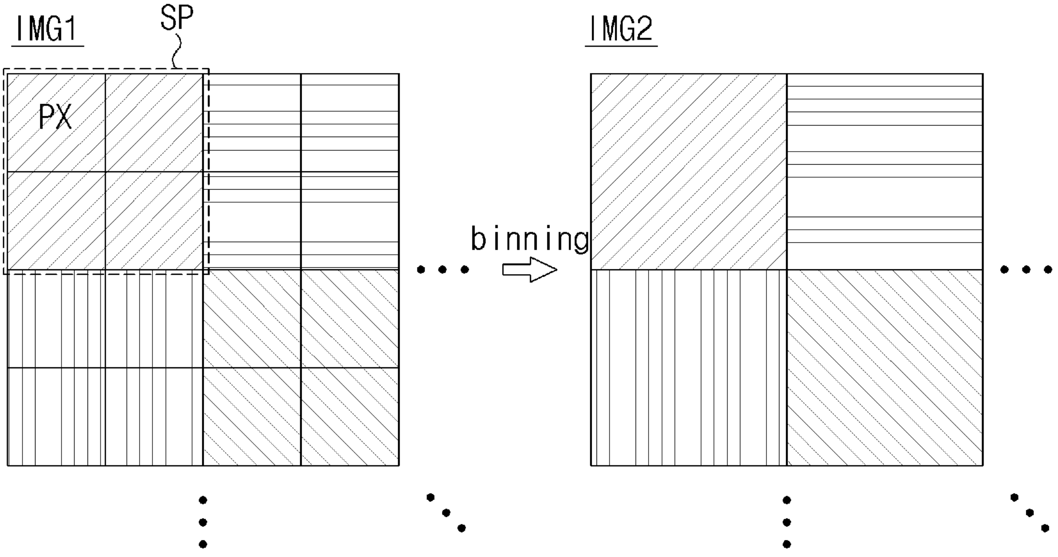
FIG. 2 is a schematic diagram illustrating an example of images shown in FIG. 1 based on some embodiments of the disclosed technology.

FIG. 2 is a schematic diagram illustrating an example of the images shown in FIG. 1 based on some embodiments of the disclosed technology.

Referring to FIG. 2, the image 1 (IMG1) to be input to the image binning unit 100 may be an image having a quad pattern. Here, the quad pattern may refer to a pattern in which unit pixels (PXs) of the same color are arranged in a (2×2) matrix composed of four unit pixels.

In some embodiments, although the embodiment of the disclosed technology has disclosed that the image 1 (IMG1) is an image having a quad pattern for convenience of description, the type of image patterns is not limited thereto, and it should be noted that various patterns can also be applied to the image as needed.

In addition, the image 2 (IMG2) generated by the image binning unit 100 may be an upscaled image generated by binning the image 1 (IMG1). That is, the image binning unit 100 may generate the image 2 (IMG2) by binning pixel values of the image 1 (IMG1). Here, 'binning' may mean summation of pixel values of the unit pixels (PXs) having the same color on a sub-pixel array (SP) basis. The image binning unit 100 may sum (e.g., 4-summation) the pixel values of the unit pixels (PXs) having the same color in the image 1 (IMG1) in units of four (2×2) pixel values (i.e., on a sub-pixel array (SP) basis), resulting in formation of the image 2 (IMG2).

In some implementations, although an embodiment of the disclosed technology has disclosed that the image 2 (IMG2) is an image obtained by summing the image 1 (IMG1) in units of four pixels, the summation unit of such images (IMG1) is not limited thereto, and can also be changed to another number of images as needed.

Figure 3:
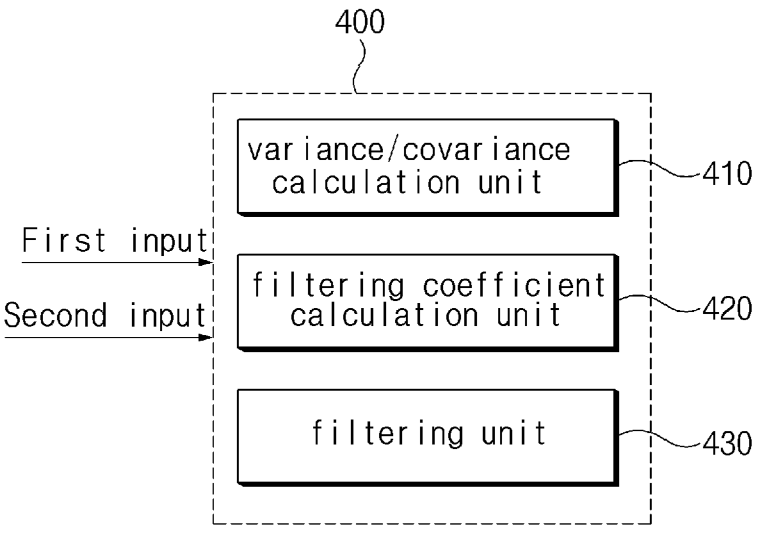
FIG. 3 is a block diagram illustrating an example of an integrated filtering unit shown in FIG. 1 based on some embodiments of the disclosed technology.

FIG. 3 is a block diagram illustrating an example of the integrated filtering unit 400 shown in FIG. 1 based on some embodiments of the disclosed technology.

Referring to FIG. 3, the integrated filtering unit 400 may include a variance/covariance calculation unit (i.e., variance/covariance calculation circuit) 410, a filtering coefficient calculation unit (i.e., filtering coefficient calculation circuit) 420, and a filtering unit (i.e., filtering circuit) 430.

In an embodiment, the variance/covariance calculation unit 410 may calculate variance and covariance values according to a first input and a second input which are configured in response to the image 1 (IMG1) and the image 2 (IMG2). In an embodiment, the variance/covariance calculation unit 410 may obtain a variance value using Equation 1 below, and may obtain a covariance value using Equation 2 below.

$$\text{Variance} = E(\text{input2}^2) - E(\text{input2}^2) \quad \text{[Equation 1]}$$

$$\text{Covariance} = E(\text{input1} \times \text{input2}) - E(\text{input1}) \times E(\text{input2}) \quad \text{[Equation 2]}$$

In Equations 1 and 2, 'E' may represent an expectation operator, i.e., an average value of pixels, 'input1' may represent a first input, and 'input2' may denote a second input. In some embodiments, the first input (input1) may be set to a pixel value for the image 1 (IMG1), or may be set to a pixel value for the image 2 (IMG2). In some embodiments, the second input (input2) may be set to a pixel value for the image 1 (IMG1), or may be set to a pixel value for the image 2 (IMG2). As described above, the values of input1 and input2 may be determined by the selection signals SEL1 and SEL2 received from the image analysis unit 200.

According to the above equation 1, it is possible to obtain how much the variance value (i.e., the value of input2) deviates from an expected value (i.e., the average value). According to the above equation 2, the covariance value (i.e., correlation information between the value of input1 and the value of input2) can be calculated.

In an embodiment, the filtering coefficient calculation unit 420 may calculate filtering coefficients in response to the variance and covariance values obtained by Equation 1 and Equation 2 above. In an embodiment, the filtering coefficient calculation unit 420 may calculate a coefficient value for a filtering operation using the following equation 3.

$$a = \frac{\text{covariance}(\text{input1}, \text{input2})}{\text{variance}(\text{input2}) + eps} \quad \text{[Equation 3]}$$

In Equation 3, 'a' may represent a filtering coefficient for setting the intensity, degree, or level of the filtering operation, and 'eps' may represent a constant value that is configured in response to the size of a pixel.

In some implementations, the filtering coefficient (a) may be set to a threshold value, so that the intensity at which detail is increased in the filtering operation can be adjusted according to the setting range of the threshold value. For example, if the value of the filtering coefficient (a) calculated by Equation 3 is greater than '1', the degree of filtering can be adjusted only up to the same detail as the original image (base image). If the value of the filtering coefficient (a) is greater than '2', the degree of filtering can be adjusted to obtain a resultant image having an increased detail that is up to twice that of the original image (base image). In some embodiments, the constant value (eps) may be set to '1'. Alternatively, the constant value (eps) may be set differently according to the size of each pixel.

In an embodiment, the filtering unit 430 may perform a filtering operation by applying a weight to the filtering coefficient obtained by the filtering coefficient calculation unit 420. In an embodiment, an arithmetic expression for performing the filtering operation by the filtering unit 430 can be represented by the following equation 4.

$$\text{Output} = \text{weight} \times (a \times (\text{input1} - \text{input2}) + E(\text{base\_image})) + (1 - \text{weight}) \times \text{base\_image} \quad \text{[Equation 4]}$$

In Equation 4, 'weight' may represent a weight, which may be set to '1'. Although the embodiment of the disclosed technology has disclosed that 'weight' shown in Equation 4 is set to '1' for convenience of description, the scope of the disclosed technology is not limited thereto, and it should be noted that the weight value shown in Equation 4 can also be allocated another value as necessary. In some embodiments, as the weight value is set to be higher, the degree of change compared to the image may be reduced. In an embodiment, 'base_image' may represent an original image (base image), i.e., a pixel value of the image 1 (IMG1).

The filtering unit 430 may multiply a filtering coefficient (a) by a value (i.e., input1-input2) obtained by subtracting the value of 'input2' from the value of 'input1', resulting in acquisition of a first value. The filtering unit 430 may multiply the base image (base_image) by the expectation operator (E), resulting in acquisition of a second value. The filtering unit 430 may calculate the sum of the first value and the second value, and may multiply the sum of the first and second values by the weight value (weight), resulting in acquisition of a third value. The filtering unit 430 may multiply a value (1-weight) obtained by subtracting the weight from the constant value '1' by the base image (base_image) (i.e., a pixel value of the image 1 IMG1), resulting in acquisition of a fourth value. The filtering unit 430 may calculate the sum of the third value and the fourth value, and may thus output an output value (Output) obtained by the filtering operation.

Accordingly, the filtering unit 430 may perform a filtering operation as shown in Equation 4, and may thus output a resultant image obtained when the filtering operation is applied to the base image (base_image). That is, the filtering unit 430 may output an image (NR) from which noise was removed because the output value (Output) is changed in response to the first input (input1) and the second input (input2). Alternatively, the filtering unit 430 may output a sharpened image (SPN).

Figure 4:
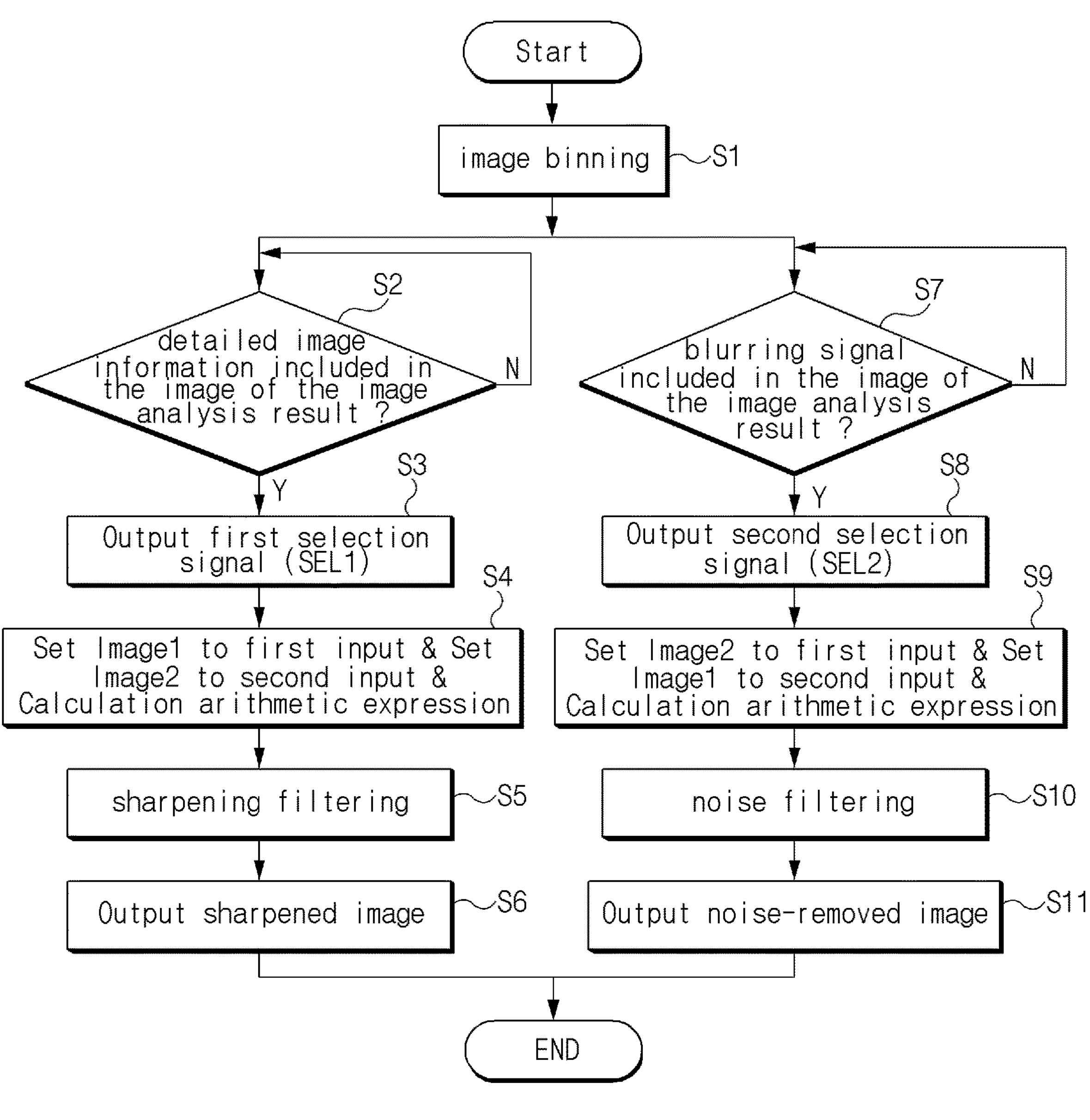
FIG. 4 is a flowchart illustrating an example of an image signal processing method based on some embodiments of the disclosed technology.

FIG. 4 is a flowchart illustrating an example of an image signal processing method based on some embodiments of the disclosed technology.

Referring to FIG. 4, the image binning unit 100 may output the image 2 (IMG2) by binning the received image 1 (IMG1) (operation S1). The image analysis unit 200 may analyze the image 1 (IMG1) as well as the image 2 (IMG2) received from the image binning unit 100. That is, the image analysis unit 200 may determine whether detailed image information such as an edge region is included in the image (operation S2). When detailed image information is included in the resultant image of such image analyzed by the image analysis unit 200 (operation S2, Y), the image analysis unit 200 may output the first selection signal SEL1 (operation S3).

Thereafter, in response to the first selection signal SEL1, the input image selection unit 300 may set the image 1 (IMG1) to the first input (input1) and may set the image 2 (IMG2) to the second input (input2). Then, the integrated filtering unit 400 may apply the first input (input1) and the second input (input2) to the arithmetic expressions, and may thus perform a calculation required for the filtering operation (operation S4).

The following table 1 is a table for describing that the calculation values to be calculated in the above equations are changed in response to the first input (input1) and the second input (input2) that are input to the filtering unit 430 so that the output value is thus changed according to the resultant calculation values.

TABLE 1

| | Selection signal (SEL1) Input1 = Image 1 (IMG1) Input2 = Image 2 (IMG2) | Selection signal (SEL2) Input1 = Image 2 (IMG2) Input2 = Image 1 (IMG1) |
|---|---|---|
| Filtering coefficient (a) of Equation 3 | Since a variance of 'input2' serving as a denominator is low, the 'a' value is relatively high. | Since a variance of 'input2' serving as a denominator is high, the 'a' value is relatively low. |
| The operation of the filtering unit 430 | The details for the average value of 'base_image' are significantly increased. | The details for the average value of 'base_image' are slightly increased. |
| Filter effect | Sharpening filtering | Noise filtering |

As can be seen from Table 1 above, upon receiving the selection signal SEL1 from the image analysis unit 200, the input image selection unit 300 may set the first input (input1) to the pixel value of the image 1 (IMG1), and may set the second input (input2) to the pixel value of the image 2 (IMG2).

Since the image 2 (IMG2) is an upscaled image of the image 1 (IMG1), the second input (input2) may have a relatively lower variance than the first input (input1). That is, when the image 1 (IMG1) and the image 2 (IMG2) are compared with each other, the image 2 (IMG2) may be a low-frequency image with less noise without including detailed image information compared to the image 1 (IMG1), and the image 1 (IMG1) may be a high-frequency image with much noise while having more detailed image information than the image 2 (IMG2).

In the Equation 3 above, since 'input2' is a denominator value, a value of the filtering coefficient (a) may be relatively high (e.g., may be greater than a predetermined first coefficient value) in a situation where the variance is low. When the value of the filtering coefficient (a) is high, the filtering unit 430 may greatly increase a detail degree for the average value of the image 1 (IMG1) serving as a base image (for example, the detail degree may increase up to a first level). Accordingly, the filtering unit 430 may perform a sharpening filtering operation by which a detail level for the image (e.g., image 1 (IMG1)) is adjusted (operation S5), so that the filtering unit 430 may thus output a sharpened image (SPN) (operation S6).

On the other hand, the image signal processor goes back to operation S1, so that the image analysis unit 200 may analyze the image 1 (IMG1) as well as the image 2 (IMG2) received from the image binning unit 100, and may determine whether a blurring signal was included in the image based on the result of analysis of the image 1 and the image 2 (operation S7). When the blurring signal is included in the image analysis resultant image of the image analysis unit 200 (operation S7, Y), the image analysis unit 200 may output the second selection signal SEL2 (operation S8).

Thereafter, in response to the second selection signal SEL2, the input image selection unit 300 may set the image 2 (IMG2) to a first input (input1) and set the image 1 (IMG1) to a second input (input2). Then, the filtering unit 430 may apply the first input (input1) and the second input (input2) to the equations above to perform calculations required for the filtering operation (operation S9).

That is, referring back to Table 1 above, upon receiving the selection signal SEL2 from the image analysis unit 200, the first input (input1) may be set to a pixel value of the image 2 (IMG2) by the input image selection unit 300, and the second input (input2) may be set to a pixel value of the image 1 (IMG1) by the input image selection unit 300.

As described above, since the image 1 (IMG1) is a high-frequency image that includes much more detailed image information and much more noise than the image 2 (IMG2), a denominator value to which the second input (input2) shown in Equation 3 is input may be large. In Equation 3, when the variance of input2 serving as a denominator value is large, the value of the filtering coefficient (a) may be relatively low (e.g., may be less than a predetermined first coefficient value). When the value of the filtering coefficient (a) is low, the filtering unit 430 may slightly increase the detail degree for the average value of the image 1 (IMG1) serving as a base image (e.g., the detail degree may increase up to a second level). Accordingly, the filtering unit 430 may perform the noise filtering operation by which noise of the image (e.g., the image 1 (IMG1)) is removed (operation S10), and may thus output an image (NR) without noise (i.e., noise-removed image) (operation S11).

As is apparent from the above description, the embodiment of the disclosed technology can implement a filter that removes noise of an image and performs a sharpening process of the image as a single logic circuit, thereby improving the quality of images and easily implementing devices.

The embodiments of the disclosed technology may provide a variety of effects capable of being directly or indirectly recognized through the above-mentioned embodiments of the present disclosure.

Although a number of illustrative embodiments have been described, it should be understood that modifications and enhancements to the disclosed embodiments and other embodiments can be devised based on what is described and/or illustrated in this disclosure and the following claims. Furthermore, the embodiments may be combined to form additional embodiments.

What is claimed is:

1. An image signal processor comprising:

an image binning circuit configured to output a second image that is upscaled by summing pixel values of a first image, which is an original image, on a sub-pixel array basis;

an input image selection circuit configured to select the first image and the second image as a first input or a second input; and an integrated filtering circuit configured to perform a filtering operation for a selected image by selecting the input image selection circuit in response to an input order of the first input and the second input, and output one of a noise-removed image and a sharpened image, wherein:

the input image selection circuit is configured to, in response to a first selection signal, set a pixel value of the first image to the first input and set a pixel value of the second image to the second input; and the input image selection circuit is configured to, in response to a second selection signal, set a pixel value of the second image to the first input and set a pixel value of the first image to the second input.

2. The image signal processor according to claim 1, further comprising an image analysis circuit configured to analyze the first image and the second image, and generate the first selection signal and the second selection signal for selecting the first input and the second input.

3. The image signal processor according to claim 2, wherein the image analysis circuit is configured to:

output the first selection signal when a result of analyzing the first image and the second image indicates that image requiring sharpening processing is included in the first image and the second image; and output the second selection signal when a result of analyzing the first image and the second image indicates that image requiring noise processing is included in the first image and the second image.

4. The image signal processor according to claim 1, wherein the integrated filtering circuit including arithmetic expression for performing filtering processing operation, wherein the integrated filtering circuit configured to perform a calculation using pixel values of the first image and the second image as input values of the arithmetic expression; and output one of the noise-removed image and the sharpened image when an output value of the arithmetic expression is changed in response to the first input and the second input.

5. The image signal processor according to claim 1, wherein the integrated filtering circuit includes:

a variance/covariance calculation circuit configured to calculate a variance value and a covariance value based on pixel values of the first input and the second input;

a filtering coefficient calculation circuit configured to calculate a filtering coefficient in response to the variance value and the covariance value; and a filtering circuit configured to perform the filtering operation for the selected image by applying a weight to the filtering coefficient.

6. The image signal processor according to claim 5, wherein the variance/covariance calculation circuit is configured to:

calculate the variance value in response to the second input and an expectation operator; and calculate the covariance value in response to the first input, the second input, and the expectation operator.

7. The image signal processor according to claim 5, wherein the filtering coefficient calculation circuit is configured to calculate an arithmetic expression in which the variance value corresponding to the second input is used as a denominator and the covariance value corresponding to the first input and the second input is used as a numerator.

8. The image signal processor according to claim 7, wherein:

the filtering coefficient calculation circuit is configured to calculate the filtering coefficient such that, when the pixel value of the second image is set to the second input, the filtering coefficient is greater than a first coefficient value; and the filtering coefficient calculation circuit is configured to calculate the filtering coefficient such that, when the pixel value of the first image is set to the second input, the filtering coefficient is less than the first coefficient value.

9. The image signal processor according to claim 8, wherein the variance value of the second input is less than the variance value of the first input.

10. The image signal processor according to claim 8, wherein the filtering circuit is configured to adjust an intensity of detail during the filtering operation in response to the filtering coefficient.

11. The image signal processor according to claim 10, wherein:

the filtering circuit is configured to output the sharpened image when the intensity of detail is increased up to a first level in a situation where the filtering coefficient is greater than the first coefficient value; and the filtering circuit is configured to output the noise-removed image when the intensity of detail is increased up to a second level in a situation where the filtering coefficient is less than the first coefficient value.

12. The image signal processor according to claim 5, wherein the filtering circuit is configured to:

calculate a first value by multiplying the filtering coefficient by a value obtained by subtracting the second input from the first input;

calculate a second value by multiplying a pixel value of the first image by an expectation operator;

calculate a third value by calculating a sum of the first value and the second value and multiplying a weight value by the sum of the first value and the second value;

calculate a fourth value by multiplying the pixel value of the first image by a value obtained by subtracting the weight value from a predetermined constant value; and perform calculation for the filtering operation for the selected image by summing the third value and the fourth value.

13. A method for processing an image signal, the method comprising:

generating a second image that is upscaled by summing pixel values of a first image, which is an original image, on a sub-pixel array basis;

in response to a first selection signal, setting a pixel value of the first image to a first input and setting a pixel value of the second image to a second input;

in response to a second selection signal, setting a pixel value of the second image to the first input and setting a pixel value of the first image to the second input; and performing one of a first filtering process operation for the first image or the second image and a second filtering process operation for the first image or the second image in response to an input order of the first input and the second input.

14. The method according to claim 13, further comprising:

determining whether the first image includes detailed image or a blurring signal by analyzing the first image; and outputting one of the first selection signal and the second selection signal based on a result of the determining.

15. The method according to claim 14, further comprising, when the first image includes the detailed image, setting the pixel value of the first image to the first input, setting the pixel value of the second image to the second input, and performing a calculation for the first filtering process operation by substituting the set first input and the second input into a predetermined arithmetic expression.

16. The method according to claim 15, wherein the first filtering process operation includes a sharpening process of adjusting an intensity of detail of the first image.

17. The method according to claim 14, further comprising, when the first image includes the blurring signal, performing a calculation for the second filtering process operation by substituting the set first input and the second input into a predetermined arithmetic expression, wherein the second filtering process operation includes a process of removing noise included in the first image.

* * * * *